United States Patent [19]
Van Egdon et al.

[11] Patent Number: 5,445,733
[45] Date of Patent: Aug. 29, 1995

[54] PLATE FILTER

[75] Inventors: Richard Van Egdon, Nörvenich; Rudolf Geiss, Niederzier, both of Germany

[73] Assignee: Eberhard Hoesch & Söhne GmbH, Verfahrens-und Anlagentechnik, Düren, Germany

[21] Appl. No.: 30,370
[22] PCT Filed: May 9, 1992
[86] PCT No.: PCT/EP92/01022
  § 371 Date: Mar. 22, 1993
  § 102(e) Date: Mar. 22, 1993
[87] PCT Pub. No.: WO92/20424
  PCT Pub. Date: Nov. 26, 1992

[30] Foreign Application Priority Data
  May 23, 1991 [DE] Germany .............. 41 16 874.7

[51] Int. Cl.⁶ .................................. B01D 25/133
[52] U.S. Cl. ........................... 210/229; 210/230; 210/231; 100/197; 100/200; 100/211
[58] Field of Search ............ 210/227, 229, 230, 231; 100/197, 199, 200, 211

[56] References Cited
U.S. PATENT DOCUMENTS

| | | | |
|---|---|---|---|
| 564,715 | 7/1896 | Remmers | 210/227 |
| 607,723 | 7/1898 | Wilson | 210/227 |
| 3,968,039 | 7/1976 | Inujima et al. | 210/225 |
| 4,172,790 | 10/1979 | Kubo | 210/227 |

FOREIGN PATENT DOCUMENTS

| | | | |
|---|---|---|---|
| 1461500 | 4/1970 | Germany . | |
| 2043156C3 | 4/1975 | Germany . | |
| 1063008 | 3/1989 | Japan | 210/227 |

*Primary Examiner*—Matthew O. Savage
*Attorney, Agent, or Firm*—Spencer, Frank & Schneider

[57] ABSTRACT

A plate filter press includes a plurality of face-to-face arranged filter plates movable into open and closed positions. Any two adjoining filter plates together define a filter chamber bounded by a continuous, raised sealing edge carried on at least one of the two adjoining filter plates. Separate heavy liquid intake members constituted by tubular bars are in fluid communication with each filter chamber. The sealing edges are provided with a respective recess extending in a longitudinal direction of the sealing edges. The tubular bars extend in the longitudinal direction and are sealingly received in the respective recesses in the closed position. Each tubular bar has a liquid outlet opening, and each sealing edge is provided with a transverse liquid passage situated between the recess and the filter chamber. The transverse liquid passage is oriented transversely to the longitudinal direction and is in a fluid communication with the liquid outlet opening of the tubular bar seated in the recess for maintaining a fluid communication between the tubular bar and the filter chamber.

5 Claims, 5 Drawing Sheets

PLATE FILTER

BACKGROUND OF THE INVENTION

The invention relates to a plate filter equipped with a plurality of filter plates that are movable by means of a closing device so as to be pressed against one another, with two adjacent filter plates in each case being in communication with one another by way of opening spacers and forming a filter chamber which is delimited by a continuous, raised sealing edge at at least one of the filter plates. At least one heavy liquid intake opens into the filter chamber and at least one of the filter plates delimiting the respective filter chamber is provided with a press membrane that can be charged by pressure medium. A preferably band-shaped filtering means is also provided which extends between each pair of adjacent filter plates.

In order to realize a large chamber volume and thus the correspondingly large cake thickness in plate filters of the above-described type, it is necessary to either configure the filter plates in the shape of a pot, in which case the bottom of the pot is formed by the press membrane and the filter surface is formed by the next-following filter plate disposed opposite the pot membrane and delimiting the filter chamber on the other side, as this is disclosed, for example, in German Patent DE 1,461,500. However, such a filter plate configuration has the drawback that, on the one hand, it has only one filter surface and, on the other hand, can be constructed only with the filter plates in the known horizontal arrangement since only with a horizontal arrangement of the filter plates the cake can be removed at the end of the filtration process.

In order to realize an increase in filter output in such plate filters, the filter plates have been designed to be effective bilaterally and the filter surface area has been enlarged in that a cake frame was placed between each pair of filter plates. The drawback of such cake frames is that it is not ensured, when the press is opened, that the filter cake drops out immediately and is transported completely out of the filter chamber by the filter band drawn through it. Remainders of filter cake that drop down later may remain lying on the filter band in the region of the sealing faces which leads to leakages in the entire system. Moreover, such cake frames require a high fill level so that the circulating filter band and the membranes or the membrane plates are not destroyed when pressure is applied. This can be realized only with easily filtrable suspensions. Finally, the provision of a cake frame requires very high closing forces so that a sufficiently high clamping force is applied to the cake frame which otherwise would be widened outwardly by the pressure of the suspension, leading to leakages and thus to malfunction of the entire press. The heavy liquid intake in such bilaterally filtering filter chambers would inevitably have to occur by way of the cake frame disposed between the two filter surfaces as this can be found, for example, in German Patent DE 2,043,156.

SUMMARY OF THE INVENTION

It is now the object of the invention to provide a plate filter of the above-mentioned type which permits the arrangement of two filter surfaces per filter chamber even without the use of cake frames.

This is accomplished according to the invention in that at least one sealing edge at each pair of adjacent filter plates is given a recess in its edge into which a tubular body extending in the direction of the sealing edge can be placed in a sealing manner as the heavy liquid intake. This tubular body is provided with heavy liquid discharge openings which open into the filter chamber. The individual tubular bodies of the filter plate packet formed by the filter plates are connected with opening spacers that engage at the individual filter plates. This arrangement makes it possible to design plate filters with vertically oriented filter plates as well as with horizontally oriented filter plates. The filtering means may here be designed, particularly for filter plates that are oriented horizontally, as an endless band which is brought through the entire filter plate packet either in zigzag form or it encloses each filter plate between itself in the form of an endless band. Since the two filtering-means which lie on mutually facing filter plate surfaces are sealingly pressed against one another from the sealing edge when the filter plate packet is closed, the solution according to the invention makes it possible to introduce the heavy liquid to be filtered between the two filtering means which delimit the filter chamber on both sides. One, but also both of the mutually facing filter faces may be given a pot shape if the sealing edge is given the appropriate height and may be provided with a press membrane on which the filtering means rests. The tubular body serving as the heavy liquid inlet is now sealingly placed into a recess disposed at the sealing edge of a filter plate advisably, however, symmetrically to the parting line in mutually contacting sealing edges and is held in a sealing manner when the filter plate packet is pressed together. On its exterior periphery the tubular body may here be provided with a separate sealing means, for example in the form of an O-ring, or it may be provided as a whole with a rubber coating so that a proper seal against the filter chamber is ensured. Due to the fact that the tubular body which serves as the heavy liquid inlet is connected with the individual filter plates by way of opening spacers, as this is known, for example, for cake frames, it is ensured that the tubular body, when in the open state, is spaced from the sealing edge so that the filter band is able to pass through freely and the resulting filter cake can be discharged properly. At the same time, it is ensured that the tubular body is always held accurately with reference to the recess in the sealing edge.

Since, particularly in plate filters equipped with a movable filter band, the filter plates are configured as squares or rectangles, the tubular body serving as the heavy liquid intake may be arranged, with respect to the direction of movement of the filter band, at the sealing wall opposite the discharge end of the filter chamber and/or, with respect to the direction of movement of the filter band, at both longitudinal sides of the filter plate. The tubular body may here extend over only part of the length of the respective plate side.

As an advantageous feature of the invention it is provided that the tubular body extends essentially over the width of the filter plate. This arrangement has the advantage that the heavy liquid does not enter the filter chamber in a "dot shape" but over the entire width of the filter chamber so that, if the heavy liquid discharge opening of the tubular body is dimensioned accordingly, the heavy liquid is able to enter the filter chamber at a slow flow rate even for large throughput quantities, thus preventing the filter surfaces in the entrance region from being washed free. Another advantage of this embodiment is that such a tubular body, which extends over the entire width of the filter plate, can be brought out of the press in a simple manner and can be connected with the appropriate hose conduits for the heavy liquid intake. This applies for an arrangement on the side of the filter chamber opposite the cake discharge as well as for a lateral arrangement with respect to the passage of the band. Such a configuration of the tubular body permits, as a further advantageous feature, the recess in the sealing edge to be formed as a longitudinally extending groove. This results in precisely definable geometric relationships which simplify the sealing process.

As a further feature of the invention it is provided that the press membrane, which is connected with the filter plate, is thickened along its edge and forms the sealing edge. This configuration makes it possible to produce filter plates having an integrated press membrane, as they are known, for example, for plastic filter plates, or filter plates in which the membrane is welded onto a basic plate body. In this connection it is advisable, as a further feature of the invention, to arrange the recess for accommodating the tubular body in the portion of the sealing edge of the press membrane near the filter chamber. This ensures proper sealing of the filter chamber. This configuration is particularly advantageous if the tubular body extends essentially over the entire width of the filter plate. Particularly in connection with a tubular body that extends over the entire width of the filter plate it is advisable for the tubular body to be deformable transversely to its longitudinal extent so that, under the influence of the closing pressure, the tubular body is able to be deformed in the same manner as the sealing edge.

As a further feature of the invention it is provided that the groove for receiving the tubular body is disposed with its edge adjacent to the exterior of the sealing edge of the press membrane in the edge of the filter plate. This arrangement has the advantage that the groove for receiving the tubular body is removed from the critical zone immediately at the edge of the filter chamber so that the sealing edge remains unweakened in this region and a proper seal is ensured. To accomplish this, it is merely necessary for the mutually associated sealing edges of oppositely disposed filter plates to be provided with grooves which, when the filter chamber is closed, are flush with the heavy liquid discharge openings of the tubular body. The tubular body itself must properly seal the gap in these regions when the filter chamber is closed.

BRIEF DESCRIPTION OF THE DRAWINGS

The invention will be described in greater detail for embodiments thereof which are illustrated in schematic drawing figures, in which.

DESCRIPTION OF THE PREFERRED EMBODIMENTS

Figure 1:
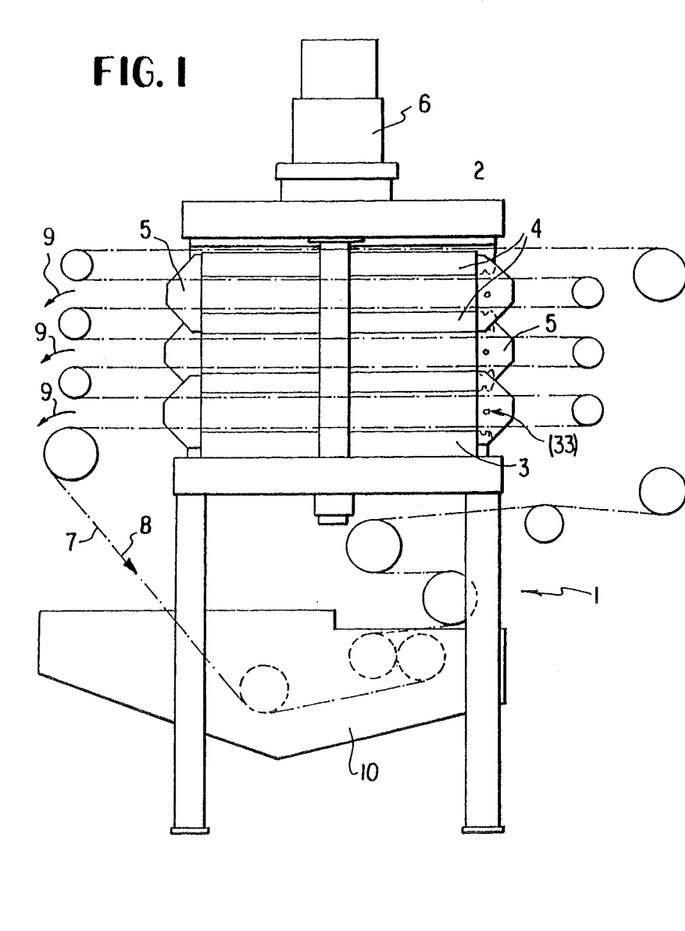
FIG. 1 depicts a plate filter having horizontally oriented filter plates.

The embodiment shown in FIG. 1 depicts a so-called automatic filter press in the open state. Here, several filter plates 4 are arranged in a machine stand 1 between two end plates 2 and 3. End plates 2 and 3 here form part of the stand, with end plate 3 being fixed to the stand while end plate 2 is movable relative to end plate 3 with the aid of a preferably hydraulically configured closing device 6. The surfaces of end plates 2 and 3 lying between end plates 2 and 3 and facing filter plates 4 are here configured as filter chamber walls, that is, they are provided with channels for the discharge of filtrate or also with an appropriately channelled press membrane. By way of opening spacers 5, the individual filter plates 4 are suspended in the manner of a chain from the upwardly movable end plate 2 so that lifting of end plate 2 causes the individual filter chambers to open successively beginning at the top.

A band-shaped filtering means 7 is brought in a zigzag arrangement through the packet of filter plates so that each filter plate is covered with filtering means on both sides. The endless filter band 7 is here guided in the customary manner over reversal and drive rollers and, if the filter plate packet is open, is pulled in the direction of the arrow 8 through the filter plate packet so that the filter cake resting on the filter band is ejected to one side from the plate filter (arrow 9). The portion of the filter band 7 pulled out of the filter plate packet at the bottom is conducted through a washing device 10 and back into the filter plate packet at the top.

Figure 2:
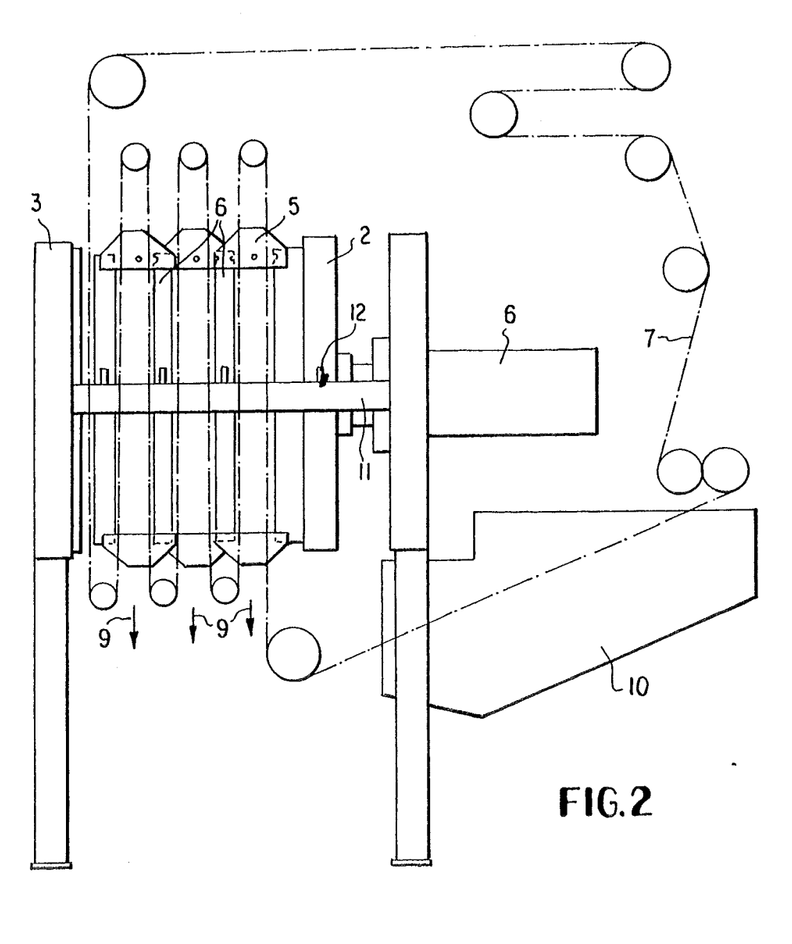
FIG. 2 depicts a plate filter having vertically oriented filter plates.

FIG. 2 show the arrangement of a plate filter having vertically oriented filter plates, likewise in the open position. The structure essentially corresponds to the embodiment of FIG. 1 so that the same reference numerals have been employed for the same components. However, in plate filters having vertically oriented filter plates, the end plate 3, which is fixed to the stand, is connected by way of two lateral tension rods 11 with the closing device 6 that is likewise fixed to the stand so that the movable end plate 2 and filter plates 4 are guided by laterally arranged contact tabs 12 to rest on tension rod 11. By way of opening spacer means 5 which are constructed in a similar manner as those in the embodiment of FIG. 1, care is again taken that, when the filter plate packet is opened, the individual filter chambers are open successively and are spaced at the same distance from one another. In this embodiment as well, an endless filter band 7 is again provided which is guided by corresponding drive and reversal rollers through a washing device 10 and in a zigzag pattern through the plate packet.

In the embodiment of FIG. 1 as well as in the embodiment of FIG. 2 it is possible, instead of guiding the filter band through the entire filter plate packet in a zigzag pattern, to provide an endless filter band that is associated with each filter plate and encloses merely that one filter plate. In a plate filter having vertically oriented filter plates, it is additionally possible to employ, instead of a movable filter band, filter cloths that are fixed to the filter plates since the removal of the cake is then possible also by gravity, supported by the press membrane. The filter cloth is here, if necessary, cleaned in a separate washing device which is introduced between a pair of plates when the plate packet is opened and sprays them off.

The heavy liquid intake into a chamber delimited by two adjacent filter plates 4 can now be effected in two different ways. In one configuration, the individual filter plates are each provided with one or more bores in the region of the sealing edge. If the plate packet is pushed together, these bores form a flow channel from which other channels branch off that extend in the sealing edge of each individual filter plate and open into the filter chamber. In another embodiment of the plate filters, it is customary to provide channels that extend in the sealing edge in the plane of the plate and that are brought to the outside and are there each connected with the heavy liquid inlet by means of an intake hose.

Figure 3:
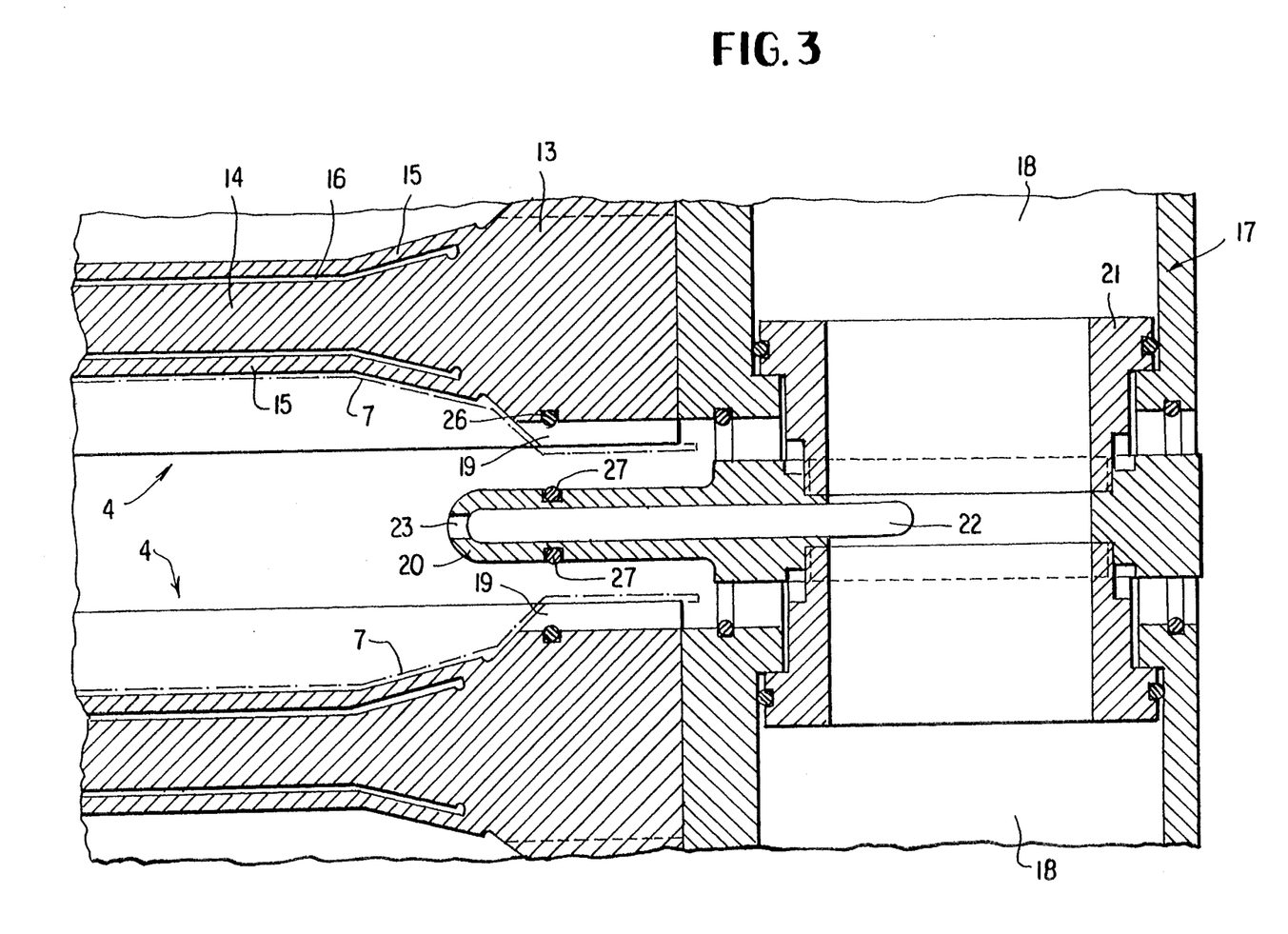
FIG. 3 depicts a first embodiment of a heavy liquid intake for a plate filter according to FIG. 1.

If now both plate surfaces that delimit a filter chamber in a plate filter as shown in FIGS. 1 and 2 are to be provided with a press membrane and with a filtering means in order to double the filter surface, the above described conventional solution of the heavy liquid intake is no longer possible. FIG. 3 shows an embodiment for an arrangement of a heavy liquid channel that extends in the plate body itself which solves the problem of the heavy liquid intake into such a filter press chamber with doubled filter surface. As shown in FIG. 3, each filter plate 4 has a sealing edge 13, which is raised to both sides relative to plate body 14, so that, with the plate packet pushed together, a filter chamber is formed in each case. In the embodiment shown in FIG. 3, filter plate 4 is provided with an integrated press membrane 15, that is, press membrane 15 is connected with the plate in one piece. A pressure medium conduit, not shown in detail here, for the supply of water or air as the pressure medium here opens into the space 16 between plate body 14 and press membrane 15 so that press membrane 15, when charged with pressure medium, is pushed into the filter chamber and a filter cake disposed therein can be pressed out.

Filter plate 4 is either provided, as shown here, with an eye-shaped attachment 17 at its outer edge which forms a continuous flow channel with a bore 18 when the plate packet is pushed together. However, bore 18 may also be disposed in the sealing edge in a broadened region in a corner of the filter plate.

Each filter plate is now provided with a recess 19 at its sealing edge through which, with the plate packet pushed together, a tubular body 20 is able to project from the outside into the filter chamber, with the tubular body being sealed by way of a sliding member 21 against the bores 18 of two adjacent filter plates and being guided in a manner secure against rotation. Tubular body 20 is in communication with sliding tube member 21 by way of an opening 22 and its other end which extends into the filter chamber is preferably provided with a plurality of juxtaposed heavy liquid discharge openings 23.

Figure 4:
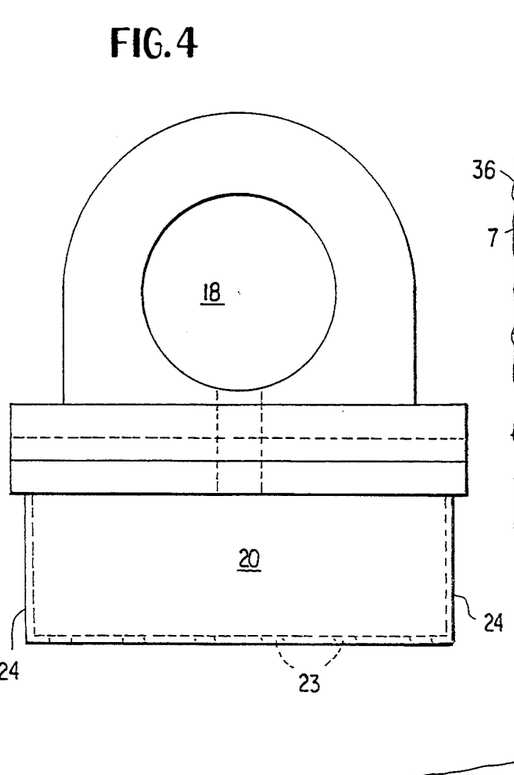
FIG. 4 is a top view of the heavy liquid intake of FIG. 3.

As indicated by the top view of FIG. 4, the tubular body 20 of this embodiment is given a box shape and extends only over a partial length of a sealing edge side between two filter plates. The ends 24 of tubular body 20 which extend in the direction of the extent of sealing edge 13 are here rounded so that, as will be described in greater detail below, the filter cloth is able to lie in close contact without being overly stretched. Several such box-shaped tubular bodies 20 may be provided for each filter chamber formed of two adjacent filter plates.

As shown in FIG. 3, the filter cloth 7 which serves as the filtering means and is brought through the filter plate packet perpendicularly to the plane of the drawing, is pulled out beyond sealing edge 13 so that it also covers recesses 19. If now the plate packet is pushed together, tubular body 20 is pressed uniformly into recesses 19 and thus simultaneously presses the filter cloth against corresponding seals 26 which, extending over the periphery of the entire sealing edge, provide a seal for the gap between two adjacent filter plates. Tubular body 20 is here provided with a corresponding counter-seal 27, as shown, or it is provided with a rubber coating over its entire surface which, in cooperation with seal 26, ensures tightness.

Figure 5:
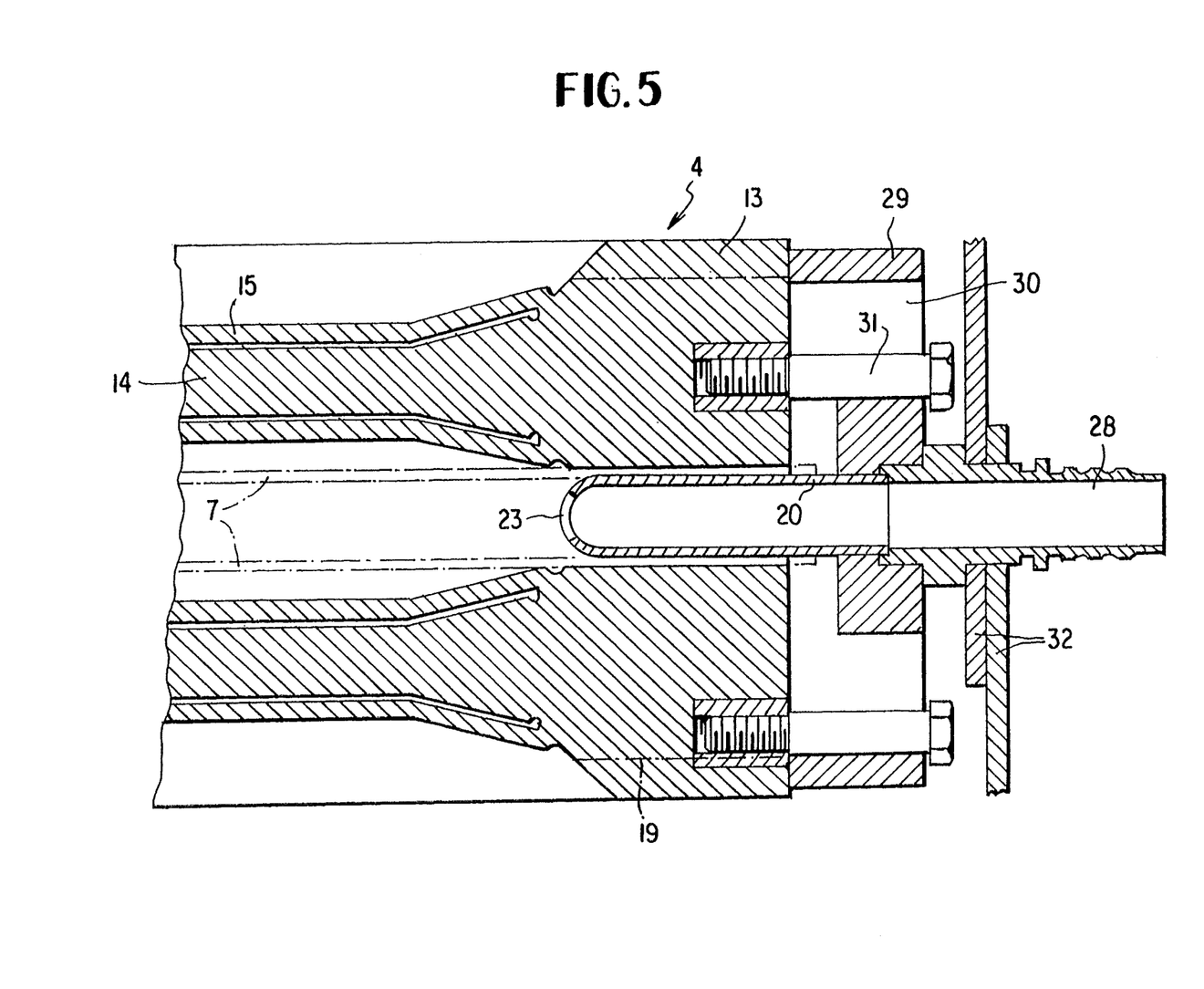
FIG. 5 depicts a first embodiment of a heavy liquid intake for a plate filter according to FIG. 2.

FIG. 5 shows a modification of the embodiment of FIGS. 3 and 4. Here, instead of a tubular attachment to the filter plate itself, the tubular body 20, which otherwise is configured in the same way as shown in FIG. 4, is provided with a pipe connection 28 for the connection of a hose. Tubular body 20 is here connected with a holding body 29 which is provided with two long holes 30 that extend in the direction of movement of filter plates 4 and are brought through screw bolts 31 for fastening to filter plates 4. Additionally, tubular body 20 is connected, by way of an opening spacer means 32 that is configured in the manner of a link chain, with the tubular body of the respectively adjacent filter chamber so that opening of the filter chamber, which is shown closed in FIG. 5, causes tubular body 20 to be again disposed at the same distance from both filter plates, as shown in FIG. 3, so that the filter cloth can be pulled through.

Figure 6:
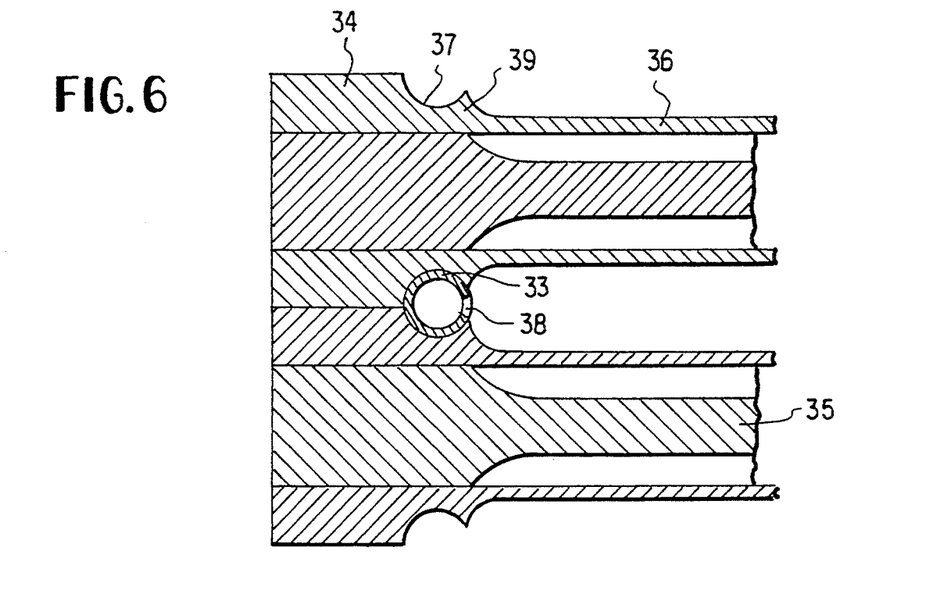
FIG. 6 is a vertical sectional view of a second embodiment of a heavy liquid intake for plate filters according to FIGS. 1 and 2.

FIG. 6 shows a particularly advantageous embodiment in a partial vertical sectional view. In this embodiment, a tubular body 33 is provided which is inserted in a corresponding recess in the sealing edge 34 of a press membrane 36 that has been glued onto a basic plate body 35. Recess 37 here extends over the entire width of the filter plate so that it is open on the sides at both ends. At one end or at both ends, the inserted tubular body is connected with the heavy liquid intake by way of appropriate hose connections. The two ends of tubular body 33 which laterally project from the filter plate are again connected with one another by way of spacers so that, if the filter plate packet is open, the tubular body is held in the center plane of the space between two filter plates.

Tubular body 33 is provided with heavy liquid intake openings 38 which open into the filter chamber disposed between the two press membranes 36. If a heavy liquid connection is provided only at one end of tubular body 33, the heavy liquid intake openings 38 are advisably provided in different sizes over the length of the tubular body, with the smaller passage cross sections being provided directly in the intake region while the largest passage cross sections are provided at the end. Thus a uniform heavy liquid intake is realized over the length and over the entire width of the filter chamber. Since the sealing edge of filter plate 4 is formed by a thickened portion of the membrane, and thus is likewise slightly deformable in view of the deformability of membrane component 36, a likewise deformable material is advisably selected for tubular body 33 so that, upon compression of the filter plate packet, tubular body 33 is also slightly deformable transversely to its longitudinal extent. The web-shaped portion 39 which delimits recess 37 toward the filter chamber here serves simultaneously as a sealing lip against the interior pressure in the filter chamber and improves the seal in this region. In deviation from the circular cross section, the cross section of tubular body 33 may here also be oval so as to adapt it to the thickness of the plate and, more precisely, to the thickness of the sealing edge formed by the membrane so as to increase the passage cross section of the tubular body itself. Thus it is possible here, without adversely affecting the structural height, to realize a larger flow cross section. The above illustrated and described embodiment of a tubular body that extends over the entire width of a filter plate may also be employed in the solid plastic filter plate described in connection with FIG. 3 in which the press membrane is connected in one piece with the plate body.

Figure 7:
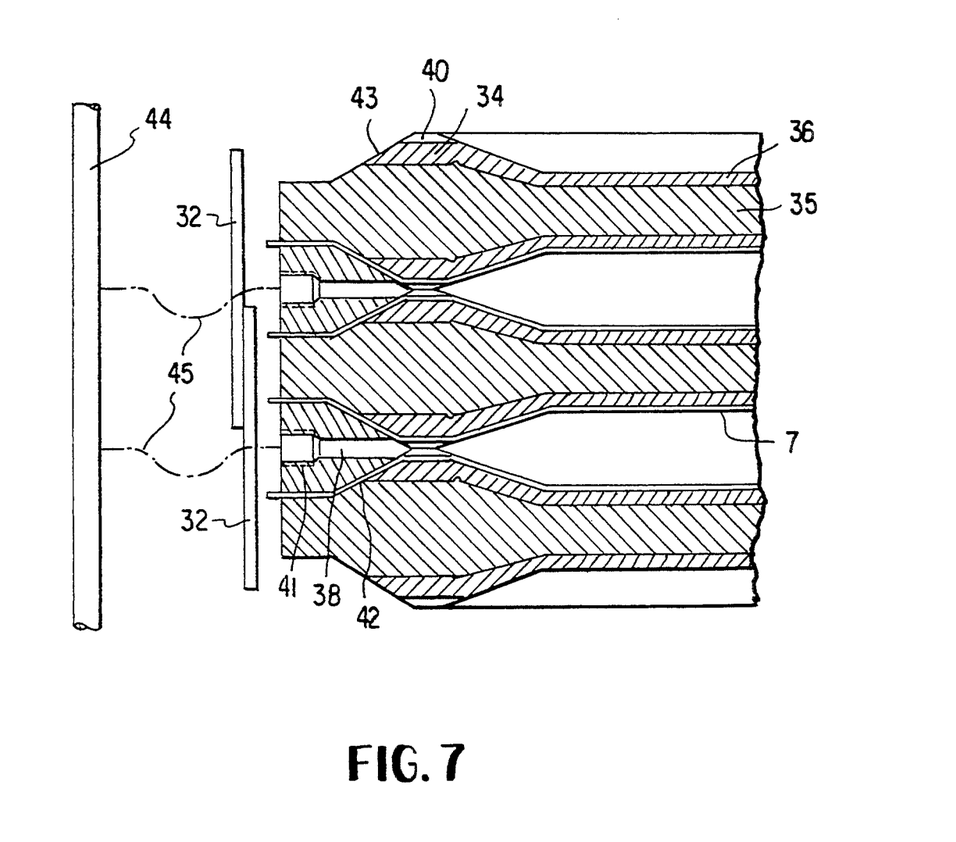
FIG. 7 is a vertical sectional view of another configuration of the embodiment of FIG. 6.

In order to now not have to weaken the sealing edge 34 of the welded-on press membrane by such a recess, FIG. 7 shows a modification of the embodiment of FIG. 6. In this embodiment, a thickened edge 34 of the press membrane 36 is provided with a plurality of transverse grooves 40 which correspond with the heavy liquid discharge openings 38 of a tubular body 41 that is arranged to extend from the outside into a recess 42 that is wedge-shaped when the filter plates are pushed together. By shaping recess 42 in a corresponding manner in the region of the outer edge, it is here possible to accomplish that, if the individual filter plates are pushed together under the influence of the closing forces, the correspondingly wedge-shaped tubular body 41 is sealingly pressed in the direction toward the filter chamber against the obliquely extending sealing edge 43 of thickened edge 34. In this embodiment as well, the individual tubular bodies 41 are spaced by means of corresponding opening spacers 32 so that their center position relative to the adjacent filter plate is maintained accurately.

The tubular bodies of the embodiments of FIGS. 3 and 5 as well as the tubular bodies of the embodiment of FIGS. 6 and 7 must be disposed at the two long sides of the respective filter plate with respect to the passage of filter band 7. If, in an embodiment according to FIGS. 3 and 4, tubular bodies are provided that extend only over part of the length of the sealing frame, with the filter cloth also being deformed by the recess in the sealing frame, then if only one heavy liquid inlet is provided, a "blind insert" must be provided on the opposite side of the frame so as to obtain a uniform expansion of the filter cloth. The same also applies if two elongate tubular bodies that extend over the full side length of a filter plate, as shown in FIG. 6, are provided.

An elongate tubular body in the embodiment of FIG. 6 or 7, additionally makes it possible to provide the inlet on a side edge of the filter plates that lies transversely to the direction of movement of the filter band since the associated hose connections can be brought out on the sides. Here, in consideration of a free discharge of the cake, it is merely necessary to arrange such a tubular body at the long edge of the filter plate disposed opposite the cake discharge side. This is indicated in FIGS. 1 and 2 by the reference numeral 33 in parenthesis.

Figure 8:
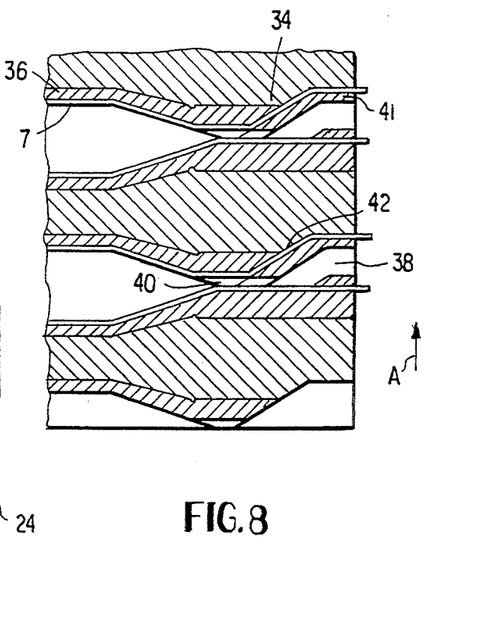
FIG. 8 depicts a modification of the embodiment of FIG. 7.

The modification of FIG. 7 shown in FIG. 8 depicts an asymmetrical configuration of recess 42 in the region of the exterior border of sealing edge 34. Here recesses 42 and transverse grooves 40 that are associated with the heavy liquid discharge openings 38 in tubular body 41 are each disposed only on one side of the filter plate.

Figure 9:
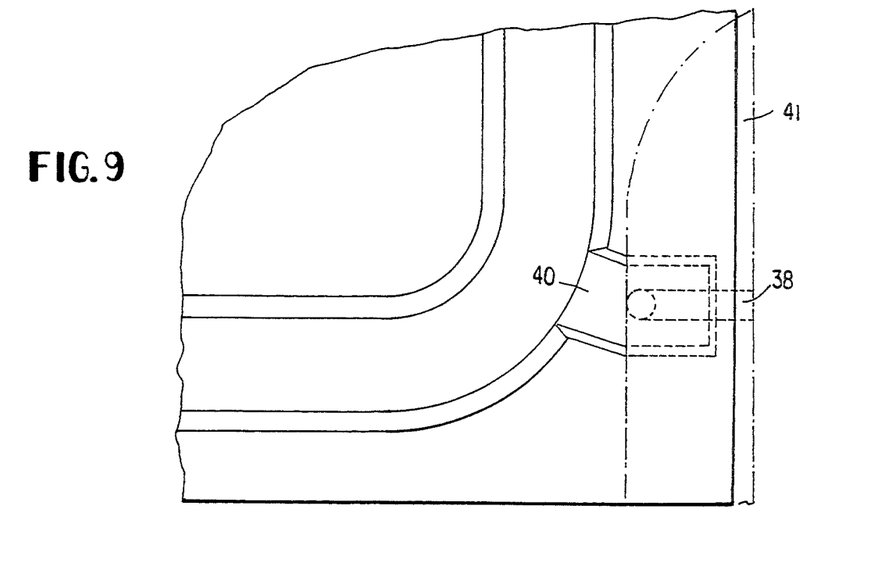
FIG. 9 is a top view of the configuration of FIG. 8 in the form of a so-called box-shaped inlet.

The arrangement according to FIGS. 7 and 8 may be employed for continuous, rod-shaped as well as for short tubular bodies 41 that extend only over part of the length of the sealing edge. FIG. 9 shows such a short configuration in a top view seen in direction A with respect to FIG. 8. The solid lines show the corner region of a filter plate 4 with its sealing edge 34 and transverse groove 40 which opens into a chamber delimited by two adjacent filter plates.

The associated tubular 41 body on top thereof when seen from the front is shown in dash-dot lines, with the regions of filter plate 4 and of sealing edge 34 hidden by tubular body 41 being shown in dashed lines. The inlet opening 38 opens against the sealing edge of the adjacent plate so that the enforced deflection of the incoming heavy liquid produces a broadening of the stream.

As can be seen in FIG. 9, in this embodiment the tubular body 41 extends only over a short partial length of sealing edge 34 and only in the corner region. Thus, such inlets may be arranged in two corners, or also in all four corners.

However, the embodiment discussed in connection with FIG. 8 may also be employed for through-going, rod-shaped tubular bodies. In that case, transverse grooves 40 are each associated with a passage opening 38.

In the embodiments according to FIGS. 5, 6, 7, 8 and 9, the heavy liquid is introduced in each case from a central supply pipe 44 by means of hose connections 45 that branch off therefrom, as this is shown in FIG. 7 by the bold dot-dash lines.

In the embodiment according to FIG. 7 as well as in the embodiment according to FIG. 8, the individual tubular bodies 41 of automatic filter presses equipped with horizontally oriented filter plates as shown in FIG. 1 may each be suspended, by way of vertical slide and spacer pins, from the respectively upper filter plate. Thus each filter plate and its associated tubular bodies forms an independent, closed flush system when the filter plate packet is opened and closed.

We claim:

1. In a plate filter press including a plurality of face-to-face arranged filter plates, any two adjoining filter plates together defining a filter chamber bounded by a continuous, raised sealing edge carried on each of said two adjoining filter plates, a separate heavy liquid intake member being in fluid communication with each filter said chamber, a pressing membrane provided on each of said two adjoining filter plates and positioned to traverse the filter chamber, each said membrane defining a said raised sealing edge, a filter element positioned to traverse each filter chamber, means for movably supporting the filter plates, closing means for moving the filter plates toward one another into a mutually contacting, closed condition and for moving the filter plates away from one another into a separated, open position, spacer means stringing the heavy liquid intake members to one another for supporting the heavy liquid intake members in said open position, wherein the improvement comprises:

each said liquid intake member is a tubular body;
adjacent ones of said sealing edges define a respective wedge shaped recess extending in a longitudinal direction of the sealing edges;
the tubular bodies extending in said longitudinal direction and being sealingly received in the respective recesses in said closed position;
each said tubular body having a plurality of liquid discharge openings spaced apart from one another in said longitudinal direction and facing said recess;

each said sealing edge being further provided with a plurality of transverse grooves situated between said recess and a respective said filter chamber;

said transverse grooves being oriented transversely to said longitudinal direction and being in fluid communication with respective ones of said liquid discharge openings of a respective said tubular body seated in a respective said recess for maintaining fluid communication between the tubular body and the filter chamber.

2. A plate filter press as defined in claim 1, wherein said filter plates have a plurality of sides each having a length dimension; each said tubular body extending along a filter plate side and substantially corresponding to said length dimension.

3. A plate filter press as defined in claim 1, wherein said pressing membrane has a thickened edge; said thickened edge comprising said sealing edge.

4. A plate filter press as defined in claim 3, wherein said transverse grooves are provided in said thickened edge adjacent the filter chamber.

5. A plate filter press as defined in claim 3, wherein said recess borders said thickened edge of said pressing membrane and is provided in an edge region of the filter plate.

* * * * *